(12) United States Patent
Sudmanns et al.

(10) Patent No.: US 7,918,914 B2
(45) Date of Patent: Apr. 5, 2011

(54) EXHAUST GAS TREATMENT COMPONENT

(75) Inventors: Hans Sudmanns, Friedrichshafen (DE);
Claudia Weigel, Friedrichshafen (DE);
Guido Schaffner, Horgenzell (DE);
Dirk Bergmann, Kressbronn (DE)

(73) Assignee: MTU Friedrichshafen, GmbH,
Friedrichshafen (DE)

( * ) Notice: Subject to any disclaimer, the term of this patent is extended or adjusted under 35 U.S.C. 154(b) by 311 days.

(21) Appl. No.: 12/317,278

(22) Filed: Dec. 19, 2008

(65) Prior Publication Data
US 2009/0178379 A1    Jul. 16, 2009

(30) Foreign Application Priority Data
Jan. 15, 2008  (DE) .................... 10 2008 004 435

(51) Int. Cl.
*B01D 39/06*  (2006.01)
*B01D 39/14*  (2006.01)
*B01D 24/00*  (2006.01)
*B01D 50/00*  (2006.01)
*F01N 3/00*  (2006.01)

(52) U.S. Cl. ............. 55/523; 55/522; 55/524; 422/169; 422/170; 422/171; 422/172; 422/177; 422/178; 422/179; 422/180; 422/181; 422/182; 60/297

(58) Field of Classification Search ............ 55/522–524; 422/169–172, 177–182; 60/297
See application file for complete search history.

(56) References Cited

U.S. PATENT DOCUMENTS

| | | | | | |
|---|---|---|---|---|---|
| 991,572 | A | * | 5/1911 | Weisenstein | .................... 55/480 |
| 2,962,121 | A | * | 11/1960 | Wilber | .......................... 55/480 |
| 4,925,469 | A | * | 5/1990 | Clement et al. | ................. 55/480 |
| 6,231,630 | B1 | * | 5/2001 | Ernst et al. | ................... 55/385.3 |
| 7,655,074 | B2 | * | 2/2010 | Nepsund et al. | ................. 95/273 |
| 7,713,321 | B2 | * | 5/2010 | Kuempel et al. | ................ 55/481 |
| 2002/0116909 | A1 | * | 8/2002 | Onoda | ........................... 55/498 |

FOREIGN PATENT DOCUMENTS

| | | |
|---|---|---|
| DE | 100 45 502 | 3/2002 |
| DE | 101 04 468 | 8/2002 |
| DE | 10 2004 005 809 | 9/2005 |

* cited by examiner

*Primary Examiner* — Walter D Griffin
*Assistant Examiner* — Amber Orlando
(74) *Attorney, Agent, or Firm* — Klaus J. Bach

(57) ABSTRACT

In an exhaust gas treatment component with a ceramic body for the purification of exhaust gases and a method for making such a component, the ceramic body is disposed in a sheet metal housing consisting of a housing base from which housing sections extend which are hinged to the housing base by webs and which form together a tubular slotted housing part surrounding the ceramic body, the housing sections being tiltable outwardly about the webs for facilitating insertion of the ceramic body into the housing.

9 Claims, 5 Drawing Sheets

EXHAUST GAS TREATMENT COMPONENT

BACKGROUND OF THE INVENTION

The present invention relates to an exhaust gas treatment component including a ceramic body surrounded by a sheet metal housing for cleaning exhaust gases and a method of manufacturing such a component.

Generally, an exhaust gas treatment component consists of a sheet metal housing in which a ceramic body is disposed. The exhaust gas flows through the ceramic body for the removal of toxic compounds from the exhaust gas. The ceramic body is securely held in the sheet metal housing by means of a ceramic fiber fleece. A ceramic body however is manufactured with large tolerances; and although a ceramic body is resistant to compression forces, it can withstand only relatively-small tension forces.

DE 101 04 468 A1 discloses a sheet metal housing consisting of two semi-shells which are welded together or interleafed or joined by crimping. Critical in this connection however is the reliability of such a joint since the clamping forces act normal to a dividing plane of the sheet metal housing.

Another design is known for example from DE 10 2004 005 089 A1, wherein the ceramic body is pressed into a single-piece sheet metal housing. For thin-walled ceramic bodies, this is critical because of their low strength. Further, supporting a ceramic body in a sheet metal housing by way of leaf springs is for example known from DE 100 45 502 A1. This however results in substantial construction expenses.

In all these examples, the ceramic bodies are firmly installed in the exhaust gas treatment component, which itself, is welded into the exhaust gas duct. As a result, the exhaust gas treatment component is difficult to remove and to replace upon failure.

It is the object of the present invention to provide an exhaust gas treatment component with a ceramic body and with a sheet metal housing which is easy to manufacture and easy to install and which is also again very easy to remove and to replace.

SUMMARY OF THE INVENTION

In an exhaust gas treatment component with a ceramic body for the purification of exhaust gases and a method for making such a component, the ceramic body is disposed in a sheet metal housing consisting of a housing base from which housing sections extend which are hinged to the housing base by webs and which form together a tubular slotted housing part surrounding the ceramic body, the housing sections being tiltable outwardly about the webs for facilitating insertion of the ceramic body into the housing.

During the manufacture of the exhaust gas treatment component, in a first step, the tubular housing is widened at the second front end which is disposed opposite the first front end by tilting the housing section radially outwardly about the respective web which acts as a hinge. Then, in a second step, the ceramic body, disposed in a ceramic fiber envelope, is placed into the slotted housing from the widened end thereof. Because of the housing being widened, it is easy to place the ceramic body, or even several ceramic bodies, into the housing without the use of force. In a third step then the slotted housing is compressed at the second front end and is returned thereby to its original shape by tilting the housing sections supported by the webs forming the hinges at the first front end radially back inwardly. Then, in a fourth step, the exhaust gas treatment component is inserted into a carrier housing. The insertion is facilitated by the provision of a chamfer at the second front end of the slotted housing. Additionally, the base body is provided with mounting or dismounting openings into which a mounting tool can be inserted. The mounting force is applied to the housing parts, not to the ceramic body or bodies. The ceramic body is not subjected to any forces during assembly of the gas treatment component. It is noted, that an unintended damaging of the ceramic body during assembly is practically impossible. In a fifth step, the exhaust gas treatment component is then screwed to the carrier housing. Since the exhaust gas treatment component is mounted by screws, it can easily be dismounted.

The invention will become more readily apparent from the following description of advantageous embodiments thereof on the basis of the accompanying drawings:

DESCRIPTION OF THE VARIOUS EMBODIMENTS

Figure 1:
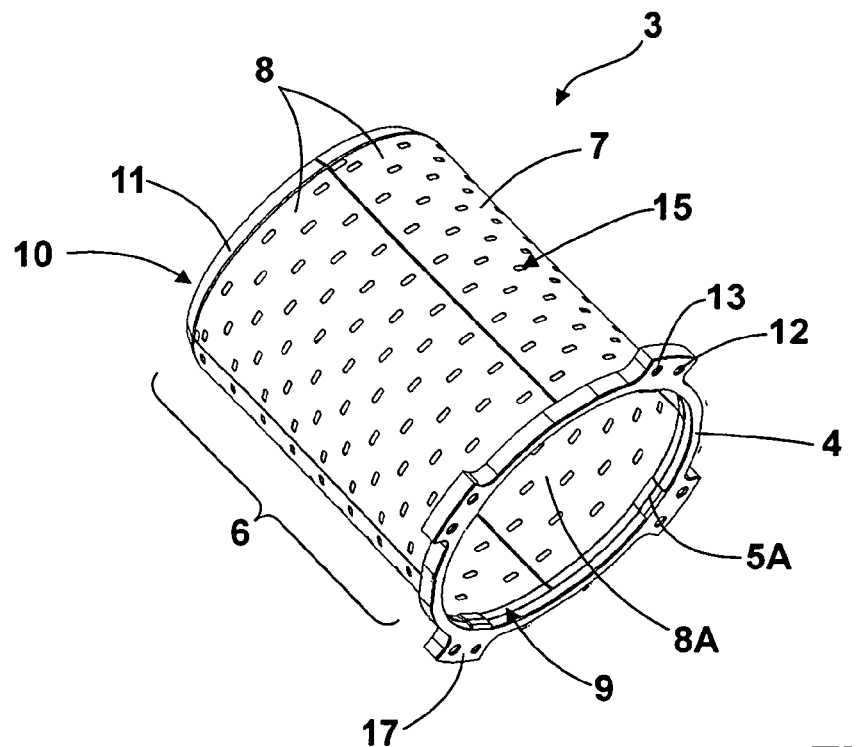
FIG. 1 shows a first embodiment of a sheet metal housing.
Figure 2:
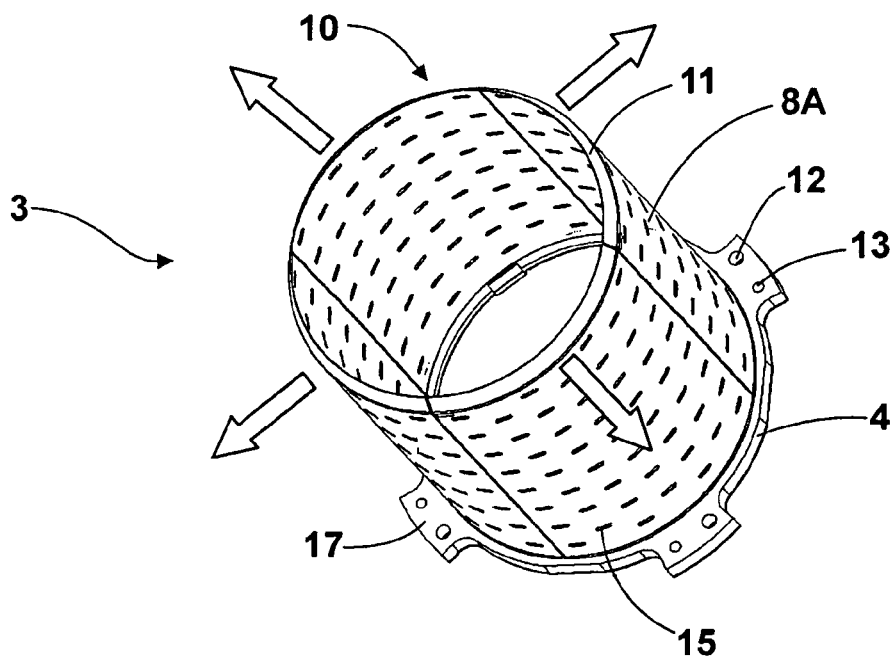
FIG. 2 shows the sheet metal housing of FIG. 1 in another view.
Figure 3:
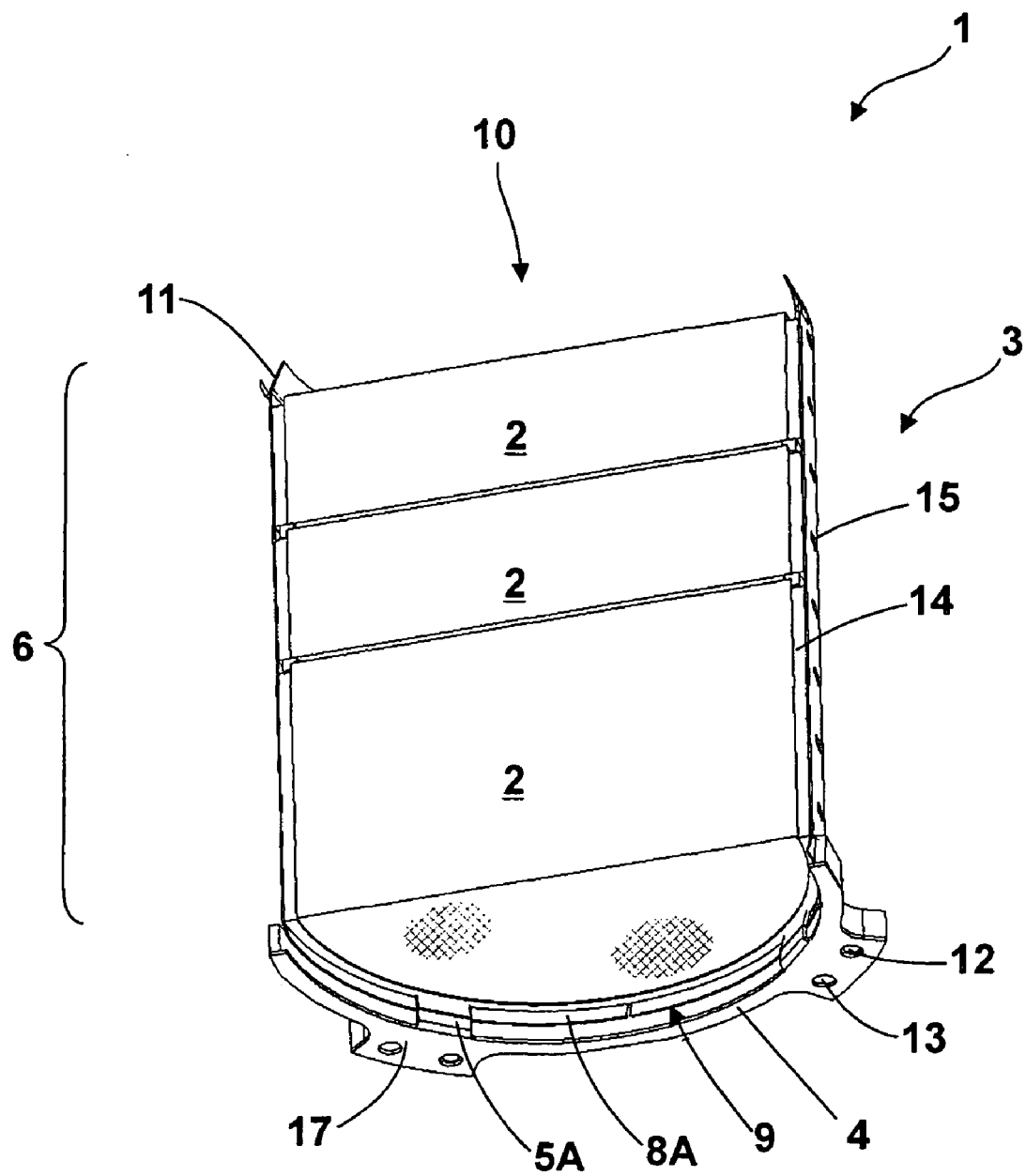
FIG. 3 shows a first embodiment of an exhaust gas treatment component.

FIGS. 1 and 2 are described concurrently since they relate to the first embodiment of the sheet metal housing with circular cross-section. FIG. 1 shows a sheet metal housing 3 with a housing base 4 at a first front end 9 thereof whereas FIG. 2 shows the sheet metal housing 3 as seen from the second front end 10. The sheet metal housing 3 comprises a single piece housing base 4, webs 5, such as web 5A of FIG. 1 and a tubular part 6 slotted in axial direction. The tubular part 6 includes several tube segments 8. In FIG. 1, four tube segments are shown. Each tube segment 8 is connected at the first front end 9 via webs 5 to the housing base 4. The tube segment 8A is for example connected to the housing base 4 by way of the web 5A. The tube segment 8, the associated web 5 and the single-piece base body 4 are integrally joined. The second front end 10 is provided with a chamfer 11 which facilitates insertion of the completed exhaust gas treatment component into a carrier housing 3. Openings 15 are punched out of shell area 7 of the tube segments 8. By the openings 15, the friction between the tube segments 8 and a ceramic fiber fleece or mat can be increased (FIG. 3). The housing base 4 is provided with mounting openings 12 and mounting/dismounting openings 13. As shown in the figures, the housing base 4 is provided for the purpose with projections 17 into which the openings are formed.

During the manufacture of the exhaust gas treatment component, in a first step, the slotted tubular part 6 is expanded at the second front end 10 thereof by tilting the tube sections 8 at the second front end outwardly about the respective webs 5 acting as hinges. The tube segment 8A is for example tilted outwardly about the web 5A (FIG. 1). This is indicated in FIG. 2 by arrows. Then, in a second step, the ceramic body enveloped in a ceramic fiber mat is inserted into the slotted tubular body 6. In a third step, the slotted tubular body 6 is then again compressed at the second front end 10 thereof so that it is returned to its original shape, by tilting the tube segment radially inwardly about the web sections 5 acting as hinges. In this state, the tube segments 8 flatly abut the circumferential surface of the ceramic body or the surrounding fiber mat that is the slotted tubular part 6 completely surrounds the ceramic body.

FIG. 3 shows a completed exhaust gas treatment component 1 in a sectional view. It shows the ceramic bodies 2 and the ceramic fiber mat 14 arranged within the sheet metal housing 3. As shown in the figure several ceramic bodies 2 may be arranged within the sheet metal housing 3 of the exhaust gas treatment component 1.

By means of the openings 15, the friction between the inner housing surface of the slotted tubular housing part 6 and the ceramic fiber mat 14 can be increased.

Also, visible is the chamfer 11 formed at the second front end 10, which facilitates the insertion of the exhaust gas treatment component 1 into the carrier housing. At the first front end 9 of the slotted tubular housing part 6, the webs 5 are provided. The tubular housing sections 8 are connected via the webs 5 to the housing base 4 so as to form an integral housing. The housing segment 8A is joined to the housing base 4 for example via the web 8A.

Figure 4:
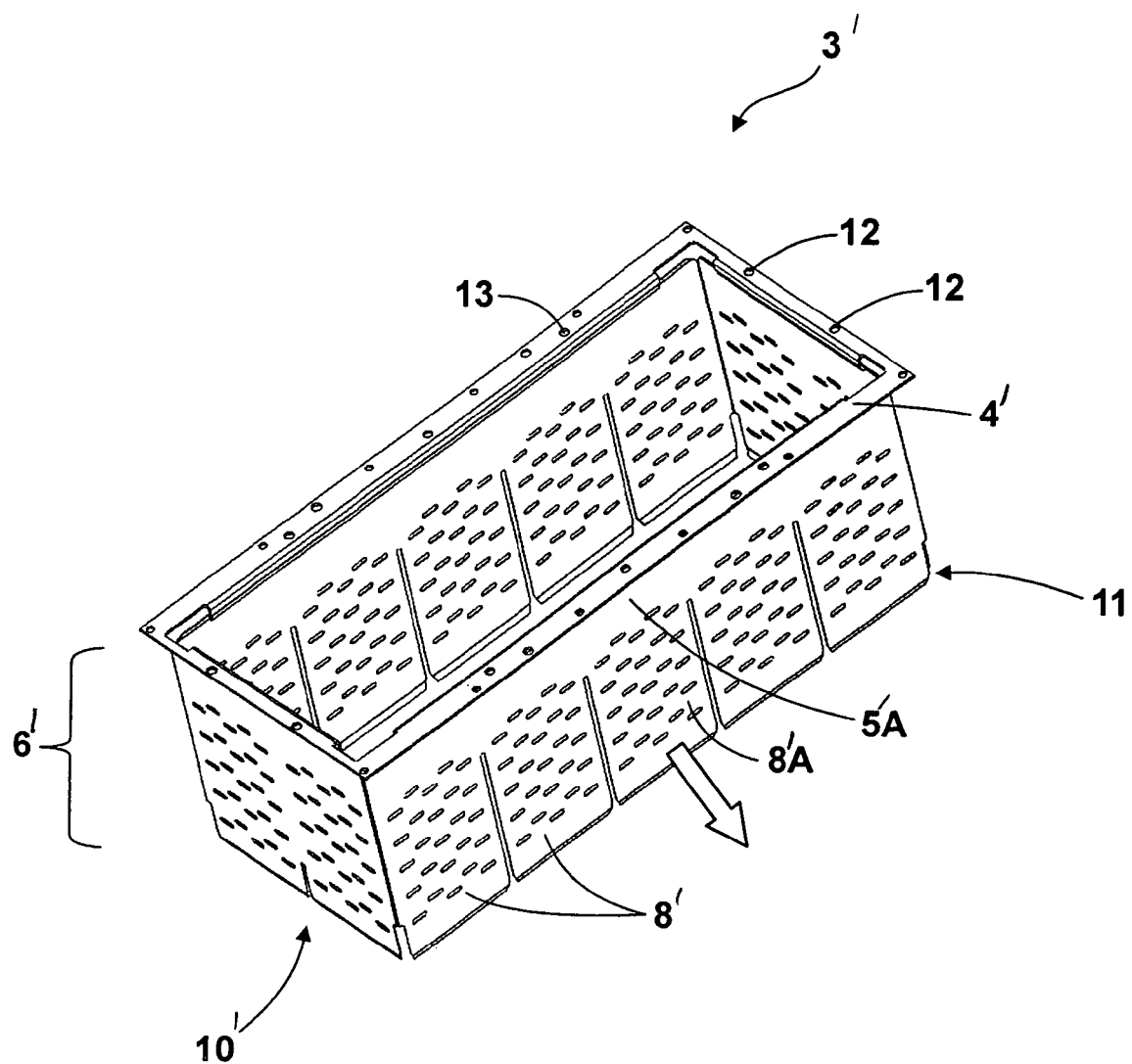
FIG. 4 shows a second embodiment of a sheet metal housing.

FIG. 4 shows a second embodiment of a sheet metal housing of oblong cross-section. The sheet metal body 3' comprises the housing base 4', the slotted tubular part 6' and webs 5'. The tube segments 8' of the slotted tubular part 6' are connected to the housing base 4' via the respective webs 5' so as to be integral therewith. For example, the tube segment 8'A is joined with housing base 4' via the web 5'A. The housing base 4' is provided with the mounting/dismounting openings 13. Also, in this case, for completion of the exhaust gas treatment component, in a first step, the slotted tube 6' is widened at the second front end 10' by tilting each tube segment 8' outwardly about the respective web 5' acting as a hinge. In FIG. 2, this is shown for example for the tube segment 8'A by an arrow. In a second step, then the ceramic body enveloped in a ceramic fiber mat is inserted into the slotted tubular housing part 6'. In a third step, then the slotted tubular housing part 6' is again compressed at the second front end 10' to return it to its original shape by tilting the tube segments 8' at the front end 10' back inwardly about the webs 5' acting as hinges. See in this connection FIG. 5, which shows the exhaust gas treatment component 1' enclosing—in this example, several ceramic bodies 2'. For increasing the friction between the tube segments 8' of the housing and the ceramic fiber mat 14, openings 15 are punched out of the tube segments 8'. Also, in this embodiment, the second front end is provided at its circumference with a chamfer 11.

Figure 5:
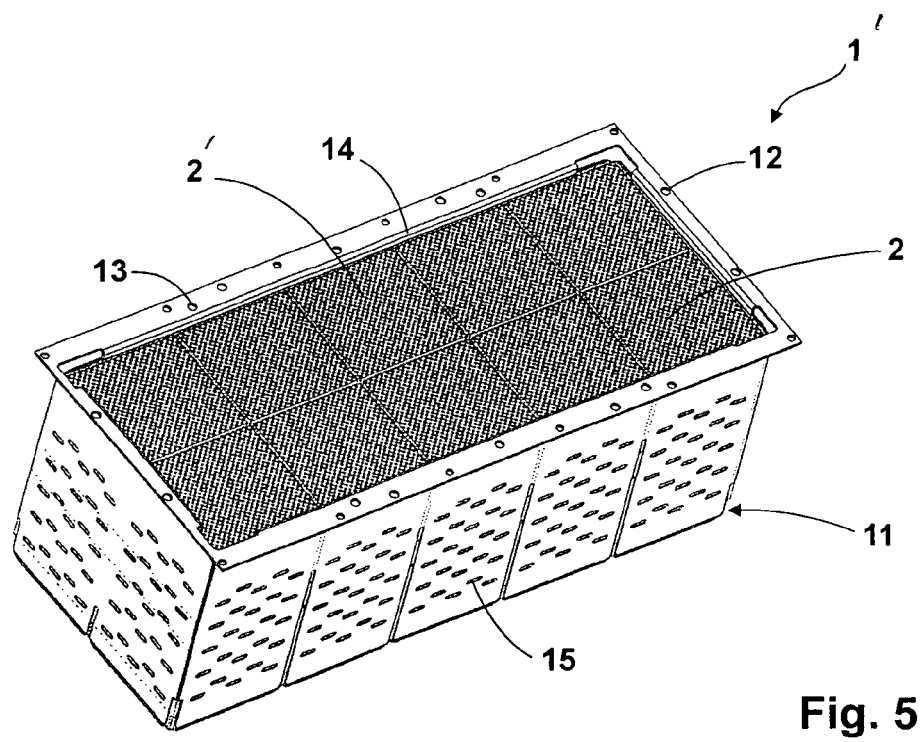
FIG. 5 shows the sheet metal housing of FIG. 4 with a ceramic body disposed therein.
Figure 6:
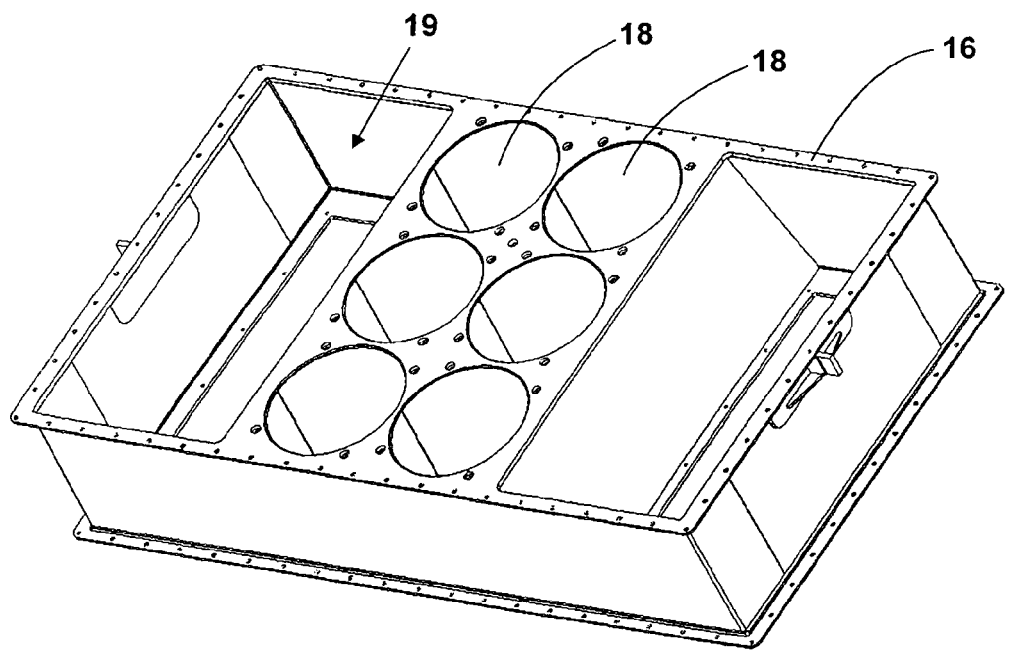
FIG. 6 shows a carrier housing for receiving the sheet metal housing containing ceramic bodies, and FIG. 7 show a block diagram of the assembly steps for the exhaust gas treatment component.

FIG. 6 shows a carrier housing 16 for accommodating several exhaust gas treatment components 1. The carrier housing 16 includes first openings 18 for accommodating circular exhaust gas treatment components of the type as shown in FIG. 3. Second oblong openings 19 are provided in the carrier housing 16 for accommodating exhaust gas treatment components of the type as shown in FIG. 5. The exhaust gas treatment components are inserted into the carrier housing 16 by an installation tool which extends into the mounting/dismounting openings 13 (FIG. 5) and introduces the exhaust gas treatment components 1, 1' from the top into the carrier housing 16. The mounting force is applied to the housing base and the sheet metal housing structure but not to the ceramic body. In this way, an accidental breakage or cracking of the ceramic body is safely avoided. The carrier housing 16 provides for a radial retaining force effective on the ceramic body via the sheet metal housing and the ceramic fiber mat. When the exhaust gas treatment components are installed in the carrier housing 16, they are attached to the carrier housing 16 by screws via the mounting openings. If an exhaust gas treatment component becomes defective, it can be removed in the opposite order and replaced.

Figure 7:
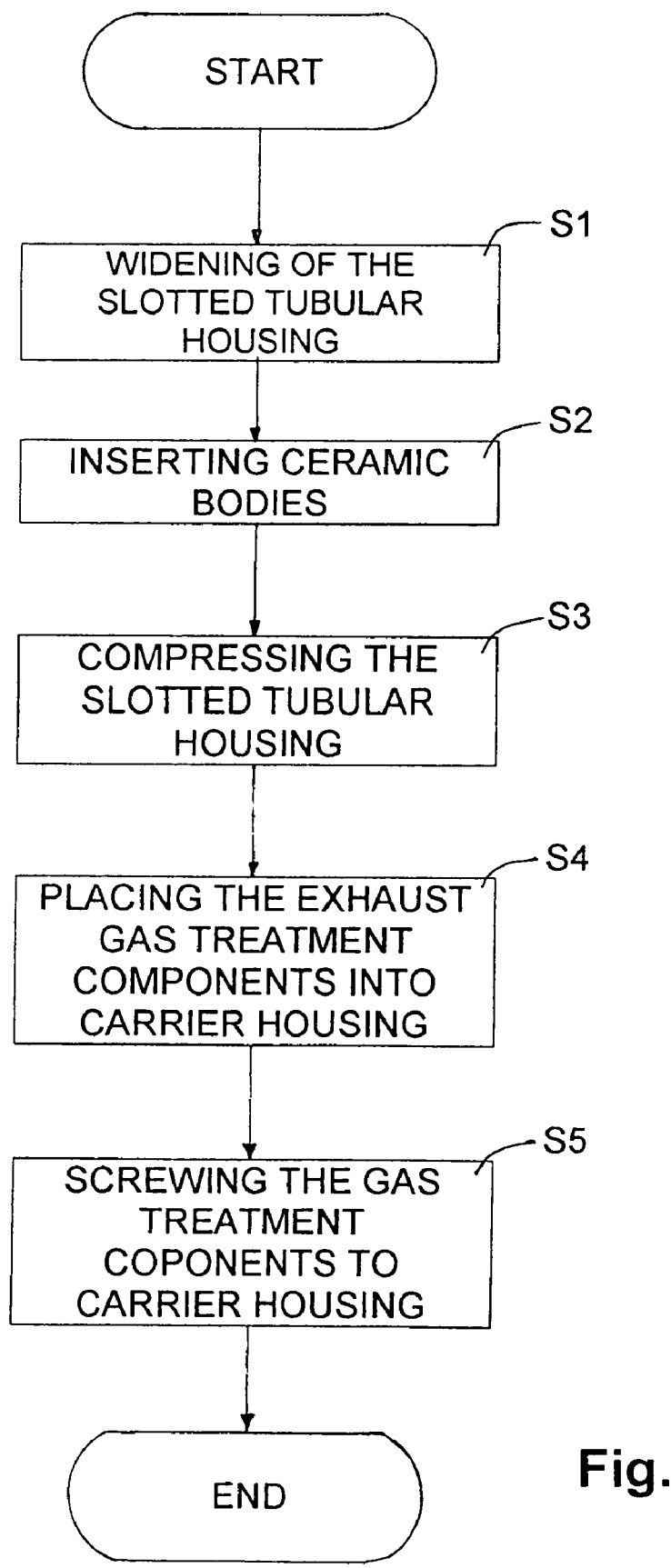

FIG. 7 shows a block diagram for the manufacturing procedure of an exhaust gas treatment component and its installation in a carrier housing. In a first step S1, the slotted tubular housing is widened at the second front end thereof (FIG. 1:10) by tilting each housing segment at the second front end radially outwardly about the web serving as a hinge. In a second step S2, then the ceramic body or bodies enveloped in a ceramic fiber mat is or are inserted into the slotted housing part. Subsequently, in a third step S3, the slotted housing part is again compressed at the second front end thereof whereby the housing segments are tilted again inwardly about the webs acting as hinges. In a fourth step S4, the exhaust gas treatment component is then inserted into the carrier housing using a mounting tool which engages the exhaust gas treatment component via the mounting/dismounting openings formed in the housing base. Subsequently, the exhaust gas component is screwed to the carrier housing in a fifth step S5. At this point, the assembly program is completed. For disassembly, the program steps are followed in the reverse order.

In summary, the following advantages are obtained:

The ceramic body is never subjected to radial forces, neither during assembly nor during disassembly. Damage to the ceramic bodies is therefore very unlikely. The radial engagement force is uniformly distributed to the outer surface of the ceramic body.

The manufacture is simple and therefore advantageous. Within the sheet metal housing several ceramic bodies may be installed in series or parallel arrangements.

What is claimed is:

1. An exhaust gas treatment component (1) with a ceramic body (2) for the purification of exhaust gases, comprising: a sheet metal housing (3) for receiving the ceramic body (2) and consisting of a housing base (4) disposed at a first front end (9) of the housing (3), housing segments (8) extending from the housing base (4) and being connected thereto by webs (5), said housing segments (8) forming together a tubular slotted housing part (6) surrounding the ceramic body (2), the webs (5) connecting the housing segments (8) to the housing base (4) forming integral pivot joints permitting outward tilting of the housing segments (8) around the pivot joints to facilitate insertion of the ceramic body (2) into the sheet metal housing (3).

2. An exhaust gas treatment component according to claim 1, wherein at a second front end (10) of the slotted housing part (6) opposite the housing base (4), the housing segments (8) are chamfered to form a chamfer (11) extending around the housing part (6) for facilitating installation of the sheet metal housing (3).

3. An exhaust gas treatment component according to claim 2, wherein the housing base (4) includes mounting and dismounting openings (12, 13).

4. An exhaust gas treatment component according to claim 3, wherein a ceramic fiber mat is arranged between the ceramic body (2) and the housing part (6).

5. An exhaust gas treatment component according to claim 4, wherein the housing segments (8) are provided with openings (15) for increasing friction between the slotted housing part (6) and the ceramic fiber mat (19).

6. An exhaust gas treatment component according to claim 1, wherein several ceramic bodies (2) are disposed in the metal sheet housing (3).

7. An exhaust gas treatment component according to claim 1, wherein at least one exhaust gas treatment component (1) is accommodated in a carrier housing (16).

8. A method for manufacturing an exhaust gas treatment component (1) with a ceramic body (2) for the purification of exhaust gases, comprising a sheet metal housing (3) for receiving the ceramic body (2) and consisting of a housing base (4) disposed at a first front end (9) of the housing (3), housing segments (8) extending from the housing base (4) and being connected thereto by webs (5), said housing segments (8) forming together a tubular slotted housing part (6) surrounding the ceramic body (2), the webs (5) connecting the housing segments (8) to the housing base (4) forming integral pivot joints permitting outward tilting of the housing segments (8) around the pivot joints to facilitate insertion of the ceramic body (2) into the sheet metal housing (3), said method comprising the steps of: widening in a first step (S1), the slotted housing part (6) at a second front end thereof opposite the first front end by tilting each housing segment (8) outwardly about its web (5) forming the hinge, inserting, in a second step (S2), a ceramic body (2) enveloped in a ceramic filter mat (14) into the slotted housing part (6) and, in a third step (S3), compressing the housing segments (8) at the second front end (10) of the sheet metal housing (3) so that the housing segments are tilted again inwardly about the webs (5) forming the hinges to return the housing to its original shape.

9. A method according to claim 8, wherein, in a fourth step (S4), the exhaust gas treatment component is installed in a carrier housing (16) using an assembly tool which engages the exhaust gas treatment component by reaching into the mounting/dismounting openings (13) of the housing base (4) and, in a fifth step screwing the exhaust gas treatment component to the carrier housing (16).

* * * * *